April 27, 1937. F. R. SHINN, SR 2,078,912
CHURN DASHER AND MIXER
Filed April 22, 1935 2 Sheets-Sheet 1

Inventor
Frank R. Shinn, Sr.

By Miller & Miller
Attorneys

April 27, 1937.  F. R. SHINN, SR  2,078,912
CHURN DASHER AND MIXER
Filed April 22, 1935  2 Sheets-Sheet 2

Inventor
Frank R. Shinn, Sr.
By Miller & Miller
Attorneys

Patented Apr. 27, 1937

2,078,912

UNITED STATES PATENT OFFICE 2,078,912

CHURN DASHER AND MIXER

Frank R. Shinn, Sr., Stark City, Mo.

Application April 22, 1935, Serial No. 17,731

2 Claims. (Cl. 259—113)

This invention relates to a churn dasher and mixer and has for an object to provide an improved churn dasher and mixer especially intended for household use.

The churn dasher and mixer of this invention is preferably made completely of hard maple wood except for a lid which is made of pressed wood pulp. It is to be used in combination with any wide mouth receptacle ordinarily found in the household, such as an empty pickle jar, coffee jar, fruit jar, stone jar or similar jar, and may either be held in position within the jar or if desired may be temporarily secured to the jar by means of a suitable jar cover top having an aperture through which the churn may extend. When thus used in combination with a jar, the action of the churn is extremely rapid and it will quickly mix any desired article placed in the receptacle or may be used for making butter from cream or milk within the receptacle. The invention is extremely inexpensive to manufacture and may be sold at a very low price. It is simple to operate and requires no expense for upkeep.

As a further feature of this invention the cover is provided with a drip catcher where the churn rod extends therethrough which drip catcher serves to catch any surplus milk or cream splashing therethrough and return the same back into the receptacle, thus preventing waste and sloppiness.

Being made entirely of wood, and preferably of hard maple the churner and dasher of this invention is proof against corrosion and is very long lived.

With the foregoing and other objects in view, as will hereinafter become apparent, this invention comprises the constructions, combinations, and arrangements of parts, hereinafter set forth, claimed, and shown on the accompanying drawings.

Figures 1, 2, 3:
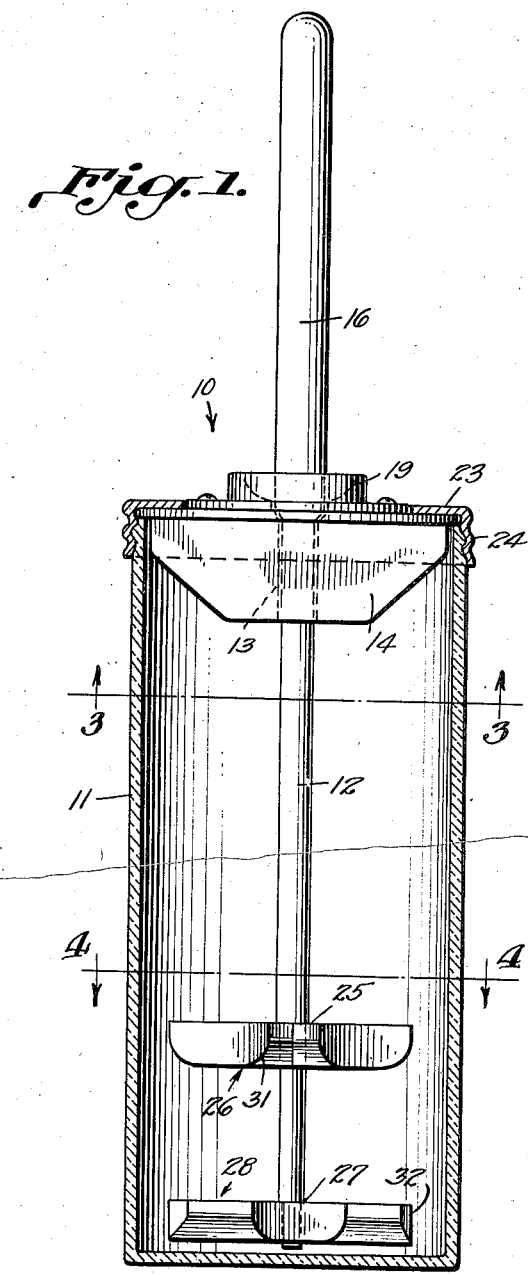
Figure 1 is a vertical sectional view of the invention.
Figure 2 is a top plan view of the same.
Figure 3 is a sectional view taken on the line 3—3 of Figure 1.
Figure 4:
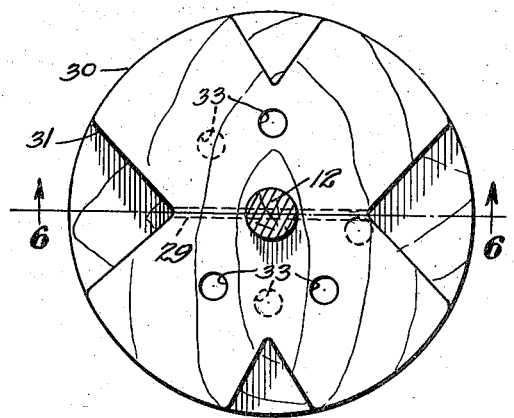
Figure 4 is a sectional view taken on the line 4—4 of Figure 1.
Figure 6:
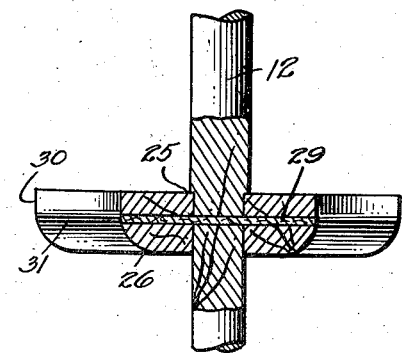
Figure 6 is a sectional view taken on the line 6—6 of Figure 4.
Figure 5:
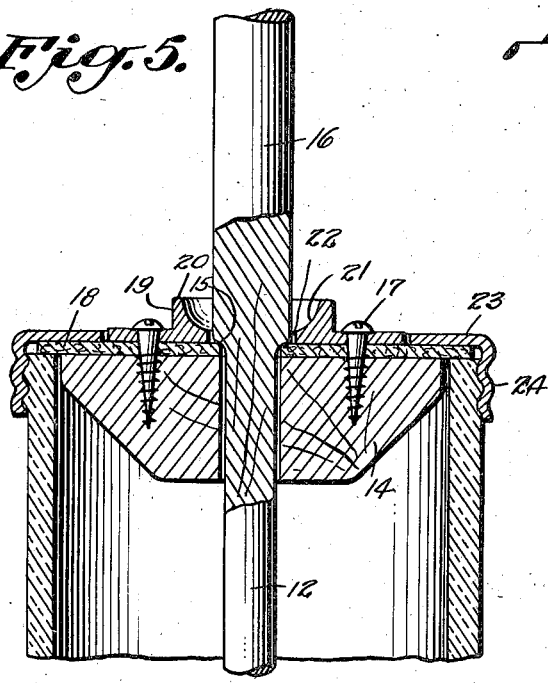
Figure 5 is an enlarged sectional view taken on the line 5—5 of Figure 2.

There is shown at 10 a churn dasher and mixer of this invention as used in combination with a wide mouthed empty fruit or pickle jar 11. The churn dasher and mixer 10 include a shaft 12 which extends through an opening 13 in a guide or trap 14. The shaft 12 is connected by a shoulder 15 to a handle 16. The guide 14 and shaft 12 are preferably made of hard maple wood, as being particularly useful for this especial purpose, this particular material being noncorrosive and long lasting in this type of service.

The guide 14 is secured by screws 17 to a lid or cover 18, the lid or cover 18 being preferably circular in outline and of a diameter equal to the usual diameter of the average size fruit or pickle jar 11. This lid 18 will preferably be made of molded or pressed wood pulp.

Likewise secured by the same screws 17 is a drip catcher 19, the drip catcher 19 having cupped lips 20 which have a concave surface 21 leading to an aperture 22 which in turn leads to the aperture through the lid 18 and through the guide 14. Any milk or cream or other material within the jar 11 which may be carried out along the shaft 12 during operation will be caught within this drip catcher 19 and be conducted by the concave surface 21 to the aperture 22 and back to the inside of the jar 11.

To hold the churn dasher and mixer 10 in position during operation, a rim cover 23 threaded as at 24 may be placed over the lid 18 holding the same fast to the jar 11. In the absence of suitable threads on the jar the lid 18 may be held by the fingers. The shoulder 15 is so situated between the shaft 12 and the handle 16 as to prevent the bottom of the shaft 12 from striking the bottom of the jar 11. A shoulder 25 provides an abutment on the shaft 12 for receiving the upper dasher 26 thereon. A similar shoulder 27 adjacent the lower end of shaft 12 provides an abutment for receiving the lower dasher 28 on the lower end of shaft 12.

The dashers 26 and 28 are each secured to the shaft 12 by means of a hard maple wood pin 29 extending through each dasher and a suitable aperture provided in the shaft 12 just below each shoulder or abutment 25 and 27. As will be observed, the shaft 12 is reduced in diameter at the shoulder 25 and is again reduced in diameter at the shoulder 27, thereby positively preventing any movement of the dashers 26 and 28 upwardly along the shaft 12 during operation.

For this reason the wooden pins 29 are ample to support the dashers 26 and 28 on the shaft 12 inasmuch as it is the abutment or shoulders that take up the downward thrust from the dashers 26 and 28. Each dasher 26 and 28 has an aperture formed therein just sufficiently large to allow the shaft 12 to pass therethrough the aperture in dasher 26 being large enough to allow this dasher 26 to pass over the shaft 12 as far as the abutment 25 while the aperture in the dasher 26 allows this particular dasher to pass over the shaft 12 only as far as the abutment 27 and they are then secured in position by means of a concealed wood pin 29.

Each dasher 26 and 28 consists of four blades 30 which are bevelled as at 31 along their lower meeting edges, their peripheral edges 32 being preferably left in cylindrical outline. As will be apparent, each dasher is formed from a circular wooden disk which is shaped into the form of a cross by cutting substantially V notches on four opposite sides thereof, and then bevelling the under part of the V notches to provide the bevel at the lower meeting edges of the blade. In placing the dashers 26 and 28 on the shaft 12 they are so placed that the blades of one dasher extend at forty-five degrees to the blades of the other dasher. Each dasher is provided with three apertures 33 extending vertically therethrough, it being observed that the apertures 33 in the upper dasher 26 are out of alignment with the apertures 33 in the lower dasher 28.

As a result of this particular shape and arrangement of the upper and lower dashers the cream, milk, or other liquids placed in the jar 11, preferably one-half to three-fourths full, will be violently agitated by even slow movement of the handle 16 as it is reciprocated up and down, the most effective churning action, however, coming on the downward movement of the shaft 12 and handle 16. The lower bevelled surfaces of the blades of the lower dasher will cause the liquid struck thereby to be impinged toward the space of the V between the blades and this very space is then passed through by the blades of the upper dasher, causing the liquid to impinge angularly away therefrom again, thus providing a double action between the lower and upper dashers. The resulting movement of the liquid within the jar is so violent that some of it will tend to escape along the opening in the guide 14 through which the shaft 12 passes. Such liquid, however, will be caught by the drip catcher 19 and be conducted back through the opening on the subsequent downward movement of the shaft 12 and handle 16.

As a result of the elimination or omission of any rotating gears or similar moving parts, there is no vibration caused by the action of this churn dasher and mixer and the jar 11 will not tend to creep over the table or supporting surface on which it is placed as the handle 16 is operated in an up and down motion. Even slow and deliberate movement of the handle 16 will cause a very rapid mixing and churning action within the liquid placed in the jar 11.

After the mixing or churning action has been completed, the churner 16 may be easily and quickly cleaned in the same manner as cleaning any wooden kitchen utensil, the only metal part, the screws 17, being in such a position that they are not exposed or contacted by any of the materials being churned or mixed and hence no corrosion can take place to possibly contaminate the material or food being prepared within the jar 11.

Figure 7:
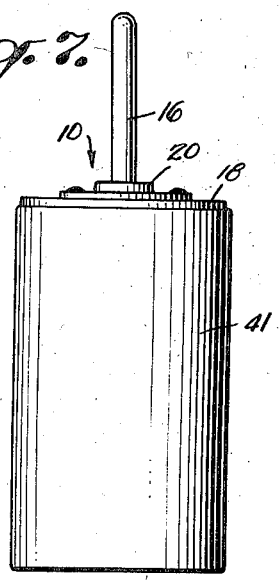
Figure 7 is a side elevation of the invention applied to another type of jar.

The churn dasher and mixer 10 has just been described as being used with a fruit jar or pickle jar 11 which is threaded to cooperate with a threaded ring 23. The invention, however, may be used with an open mouthed jar not having any threads thereon such as the standard jar shown at 41 in Figure 7. In this form the churn dasher is merely placed so that the lid 18 rests on the top of the open mouth of the jar 41 and will be held in position by the fingers of one hand while the fingers of the other hand will operate the handle 16 of the churn dasher and mixer. Due to the absence of vibration and the quick action of this churn dasher and mixer as already described, the invention when used in this form is substantially as effective as when used in the form previously described.

The novel features and the operation of this device will be apparent from the foregoing description. While the device has been shown and the structure described in detail, it is obvious that this invention is not to be considered limited to the exact form disclosed and that changes may be made therein within the scope of what is claimed without departing from the spirit of the invention.

Having thus set forth and disclosed the nature of this invention, what is claimed is:

1. A churn dasher and mixer comprising a churn shaft and handle, said churn shaft being of reduced diameter and extending integrally from the handle, a guide through which said churn shaft is reciprocable within one limit set by the enlarged handle, a pair of churn dashers secured to said churn shaft below said guide, said shaft being reduced to form a shoulder against which the upper dasher abuts and being further reduced to form a further shoulder against which the lower dasher abuts, each dasher having a wood pin to fasten said dasher to said churn shaft, said churn shaft and guide likewise being made of wood, each dasher being in the form of a cross having four blades bevelled along their under meeting edges, each aperture having three apertures extending vertically therethrough, the blades and apertures of one dasher being spaced substantially forty-five degrees on vertical alignment with the blades and apertures of the other churn dasher, the blades of the upper dasher overlapping the blades of the lower dasher to provide a reagitating effect, a jar lid, said guide being secured to said jar lid whereby said dashers may be reciprocated within a jar to which the lid is secured.

2. A churn dasher and mixer comprising a churn shaft and handle, said churn shaft being of reduced diameter and extending integrally from the handle, a guide through which said churn shaft is reciprocable within one limit set by the enlarged handle, a pair of churn dashers secured to said churn shaft below said guide, said shaft being reduced to form a shoulder against which the upper dasher abuts and being further reduced to form a further shoulder against which the lower dasher abuts, each dasher having a wood pin to fasten said dasher to said churn shaft, said churn shaft and guide likewise being made of wood, each dasher being in the form of a cross having four blades bevelled along their under meeting edges, each aperture having three apertures extending vertically therethrough, the blades and apertures of one dasher being spaced substantially forty-five degrees on vertical alignment with the blades and apertures of the other churn dasher, the blades of the upper dasher overlapping the blades of the lower dasher to provide a reagitating effect, a jar lid, said guide being secured to said jar lid whereby said dashers may be reciprocated within a jar to which the lid is secured, and a drip catch mounted on the top of said lid, said drip catch comprising a base, and an apertured concave cup through which said churn shaft may reciprocate.

FRANK R. SHINN, Sr.